US009565614B2

(12) United States Patent
Hong et al.

(10) Patent No.: US 9,565,614 B2
(45) Date of Patent: Feb. 7, 2017

(54) METHOD FOR CONTROLLING HANDOFF OF IEEE 802.22 NETWORK-BASED MOBILE TERMINAL

(75) Inventors: Choong Seon Hong, Yongin-si (KR); Sung Won Lee, Seongnam-si (KR); Jun Lee, Jeonju-si (KR)

(73) Assignee: UNIVERSITY-INDUSTRY COOPERATION GROUP OF KYUNG-HEE UNIVERSITY, Yongin-Si, Gyeonggi-Do (KR)

( * ) Notice: Subject to any disclaimer, the term of this patent is extended or adjusted under 35 U.S.C. 154(b) by 81 days.

(21) Appl. No.: 14/369,810

(22) PCT Filed: Dec. 29, 2011

(86) PCT No.: PCT/KR2011/010279
§ 371 (c)(1),
(2), (4) Date: Oct. 20, 2014

(87) PCT Pub. No.: WO2013/100226
PCT Pub. Date: Jul. 4, 2013

(65) Prior Publication Data
US 2015/0036657 A1      Feb. 5, 2015

(30) Foreign Application Priority Data

Dec. 29, 2011    (KR) .......................... 10-2011-0145466

(51) Int. Cl.
*H04W 36/32*    (2009.01)
*H04W 36/08*    (2009.01)

(52) U.S. Cl.
CPC ............. *H04W 36/32* (2013.01); *H04W 36/08* (2013.01)

(58) Field of Classification Search
None
See application file for complete search history.

(56) References Cited

U.S. PATENT DOCUMENTS

2006/0227744 A1* 10/2006 Metke ................... H04W 36/32
                                                                      370/331
2007/0025296 A1*  2/2007 Jung .................... H04W 36/32
                                                                      370/331

(Continued)

FOREIGN PATENT DOCUMENTS

| KR | 1020060032466 A | 4/2006 |
| KR | 1020110129483 A | 12/2011 |
| KR | 1020110135873 A | 12/2011 |

OTHER PUBLICATIONS

English translation of Lee, Jun, et al., Design of Mechanism for Supporting Mobility of IEEE 802.22 WRAN System, 2011 Fall Conference of Korean Institute of Information Scientists and Engineers, vol. 38, Issue 2D, pp. 294-297, Nov. 2011 (citations based on attached English Translation).*

(Continued)

*Primary Examiner* — Benjamin Lamont
(74) *Attorney, Agent, or Firm* — Hauptman Ham, LLP

(57) ABSTRACT

The present invention relates to a method for controlling handoff of a mobile terminal, and more specifically, to a method for controlling handoff of a mobile terminal in an IEEE 802.22 wireless regional area network (WRAN) communication standard for defining communication of a fixed terminal which uses a frequency band that is not regionally used among television broadcasting frequency bands.

7 Claims, 10 Drawing Sheets

(56) References Cited

U.S. PATENT DOCUMENTS

| | | | | |
|---|---|---|---|---|
| 2009/0059867 A1* | 3/2009 | Rajasimman | ......... | H04W 16/32 370/332 |
| 2011/0194532 A1* | 8/2011 | Kakkad | ................ | H04W 36/30 370/331 |
| 2011/0310865 A1* | 12/2011 | Kennedy | ............... | H04W 4/028 370/338 |
| 2011/0317662 A1* | 12/2011 | Choi | ................ | H04W 36/0066 370/331 |
| 2012/0157119 A1* | 6/2012 | Shu | .................. | H04W 36/0072 455/456.1 |
| 2013/0023302 A1* | 1/2013 | Sivanesan | ............ | H04W 36/32 455/525 |
| 2013/0044731 A1* | 2/2013 | Shi | ....................... | H04L 1/1607 370/331 |

OTHER PUBLICATIONS

Jun Lee et al., Journal of Conference in Korea Institute of Information Scientists and Engineers, "Design of Mechanism for Supporting Mobility of IEEE 802.22 WRAN System", Nov. 2011, pp. 294-297, vol. 38, No. 2(D).

International Search Report mailed Nov. 7, 2012 for PCT/KR2011/010279, citing the above reference(s).

* cited by examiner

FIG. 7

| Field | Description |
|---|---|
| Position | Position of CPE where information is collected |
| Serving BS ID | ID of Base Station to which CPE is attached |
| Neighbor BS ID | ID of Base Station neighboring to current position |
| Serving BS Channel List | Channel available in current attached Base Station |
| Neighbor BS Channel List | Channel available in Base Station neighboring to current position |
| Data rate | Data serviced to relevant CPE |

METHOD FOR CONTROLLING HANDOFF OF IEEE 802.22 NETWORK-BASED MOBILE TERMINAL

TECHNICAL FIELD

The present invention relates to a method for controlling a handoff of a mobile terminal, and more specifically, to a method for controlling a handoff of a mobile terminal in an IEEE 802.22 wireless regional area network (WRAN) communication standard for defining communication of a stationary terminal which uses a frequency band that is not regionally used among television broadcasting frequency bands.

BACKGROUND ART

Federal Communications Commission (FCC) approved a communication service on November 2008, in which when a frequency band including a very high frequency (VHF) band and an ultra high frequency (UHF) band which are used as frequency bands for broadcasting in television satisfies the regulatory conditions determined by FCC, it is permitted as an unlicensed band that can be used by anyone.

In order to live up to this, researches are in progress on a wireless communication technology which uses a frequency band that is not regionally used among television broadcasting frequency bands in a wide range of applicable fields. The IEEE 802.22 WRAN communication standard is a communication standard that allows an unlicensed user to use a frequency band that is not regionally used among television broadcasting frequency bands. Currently, a frequency band is found and utilized which is not used among VHF and UHF frequency bands used for analog television broadcasting on a basis of a cognitive radio technology so that a wireless internet service can be provided with a maximum date rate of 22 Mbps within a radius of 100 km. Thus, a broadband wireless communication can be provided at a low cost to suburbs where less television channels and more white space frequency bands are available using the IEEE 802.22 WRAN communication standard.

However, the current IEEE 802.22 WRAN assumes that terminals (i.e., customer premise equipments: CPEs) constituting the IEEE 802.22 WRAN are used in a fixed environment with no mobility. Therefore, the IEEE 802.22 WRAN which does not ensure mobility entails a problem in that a communication service cannot be provided to mobile terminals such as notebook computers, cellular phones, PDAs and the like.

DISCLOSURE OF INVENTION

Technical Problem

Accordingly, the present invention has been made to solve the above-mentioned problem involved in the IEEE 802.22 WRAN, and it is an object of the present invention to provide a method for controlling a handoff of a mobile terminal, in which a handoff of a mobile terminal is controlled in the IEEE 802.22 WRAN, ensuring mobility of the mobile terminal.

Another object of the present invention is to provide a method for controlling of a handoff of a mobile terminal, in which information on a neighboring base station is collected through a terminal positioned at a cell boundary of a base station and a handoff is performed through a handoff map generated from the collected information on the neighboring base station, thereby shortening the time spent to perform the handoff and thus reducing a packet loss.

Still another object of the present invention is to provide an a method for controlling of a handoff of a mobile terminal, in which a moving direction of a terminal and a handoff neighboring base station located in the moving direction of the terminal are determined using position information acquired through a GPS module included in the terminal or a base station, thereby controlling the handoff in an accurate and rapid manner.

Technical Solution

To achieve the above object, the present invention provides a method for controlling a handoff of a mobile terminal, the method including the steps of: generating a handoff map including information on a neighboring base station located around a base station from identifiers of and position information on attached terminals located at a cell area of the base station, which are received from the attached terminals, and information on the neighboring base station, which is received by the attached terminals from the neighboring base station; if the base station receives a handoff request message from an attached mobile terminal moving to the neighboring base station among the attached terminals, determining a handoff neighboring base station to which the attached mobile terminal is handed off based on the generated handoff map and information on the movement of the attached mobile terminal in response to the handoff request message; allowing the base station to generate a handoff response message including the determined handoff neighboring base station, and to transmit the generated handoff response message to the attached mobile terminal; if the base station receives a handoff indication message from the attached mobile terminal after the attached mobile terminal has been handed off to the neighboring base station based on the handoff response message, blocking a communication with the attached mobile terminal in response to the received handoff indication message; and if the base station receives a handoff completion message from the handoff neighboring base station through a backbone network, deleting an identifier of the attached mobile terminal registered as an attached terminal of the base station, the identifier being stored in a registration database connected to the backbone network.

In the handoff control method according to the present invention, the handoff control method may conform to an IEEE 802.22 WRAN communication standard using a frequency band that is not regionally used among television broadcasting frequency bands.

In the handoff control method according to the present invention, the information on the neighboring base station may be at least one from among position information on the neighboring base station, an identifier of the neighboring base station, and information on an available channel used by the neighboring base station. Preferably, the base station and the neighboring base station, and the attached terminals of the base station and the neighboring base station may include a GPS module, respectively, and the position information on the neighboring base station may be acquired by the GPS module.

In the handoff control method according to an embodiment of the present invention, the attached mobile terminal may compare of the signal strength of a first beacon message transmitted thereto from the base station with that of a second beacon message transmitted thereto from the handoff neighboring base station, and perform a handoff to the handoff neighboring base station and transmits a handoff indication message to the base station if the signal strength of the second beacon message is higher than that of the first beacon message.

In the handoff control method according to another embodiment of the present invention, the attached mobile terminal may transmit a handoff request message to the base station if the signal strength of the first beacon message transmitted thereto from the base station is lower than a critical signal strength.

In the handoff control method according to another embodiment of the present invention, the step of generating the handoff map may include the steps of: periodically receiving position information on the attached terminals located at the cell area of the base station; controlling the operation mode of the attached terminals located at the cell area boundary of the base station to be converted into a coexisting mode based on the received position information of the attached terminals; receiving information on the neighboring base station from the attached terminals whose operation mode is converted into the coexisting mode; and generating a handoff map including information on the neighboring base stations located around the base station based on the received information on the neighboring base station.

In the handoff control method according to another embodiment of the present invention, the step of determining the handoff neighboring base station may include the steps of: receiving a handoff request message from the attached mobile terminal moving to the neighboring base station among the attached terminals; calculating a moving direction of the attached mobile terminal based on position information on the attached mobile terminal moving to the neighboring base station in response to the handoff request message, which has been stored in the handoff map; and determining a neighboring base station located in the moving direction of the attached mobile terminal to be a handoff neighboring base station based on the calculated moving direction of the attached mobile terminal and the handoff map.

Preferably, if the neighboring base station of a critical range located in the moving direction of the attached mobile terminal is present in plural numbers, the plurality of neighboring base stations may be determined to be the handoff neighboring base stations. If the plurality of neighboring base stations are determined to be the handoff neighboring base stations, the attached mobile terminal may be handed off to a handoff neighboring base station which transmits a beacon message having the highest signal strength among the signal strengths of beacon messages transmitted thereto from the plurality of neighboring base station determined to be the handoff neighboring base station.

Preferably, the handoff map may include an identifier of the base station, position information on the attached mobile terminal of the base station, an identifier of the neighboring base station, information on an available channel of the base station, and information on an available channel of the neighboring base station.

Advantageous Effects

The handoff control method according to the present invention having the configuration as described above have the following various advantageous effects.

First, the handoff control method according to the present invention controls a handoff of a mobile terminal in the IEEE 802.22 WRAN, ensuring mobility of the mobile terminal.

Second, the handoff control method according to the present invention enables information on a neighboring base station to be collected through a terminal positioned at a cell boundary of a base station and allows a handoff to be performed through a handoff map generated from the collected information on the neighboring base station, thereby shortening the time spent to perform the handoff and thus reducing a packet loss.

Third, the handoff control method according to the present invention enables a moving direction of a terminal and a handoff neighboring base station located in the moving direction of the terminal to be determined using position information acquired through a GPS module included in the terminal or a base station, thereby controlling the handoff in an accurate and rapid manner.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 7 shows an example of fields of the generated handoff map and data corresponding to each of the fields;

EXPLANATION OF SYMBOLS

110: handoff map generation unit
120: moving direction determination unit
130: handoff neighboring base station determination unit 140: handoff response message generation unit
150: handoff control unit

BEST MODE FOR CARRYING OUT THE
INVENTION

Now, a handoff control method according to a preferred embodiment of the present invention will be described hereinafter in detail with reference to the accompanying drawings.

Figure 1:
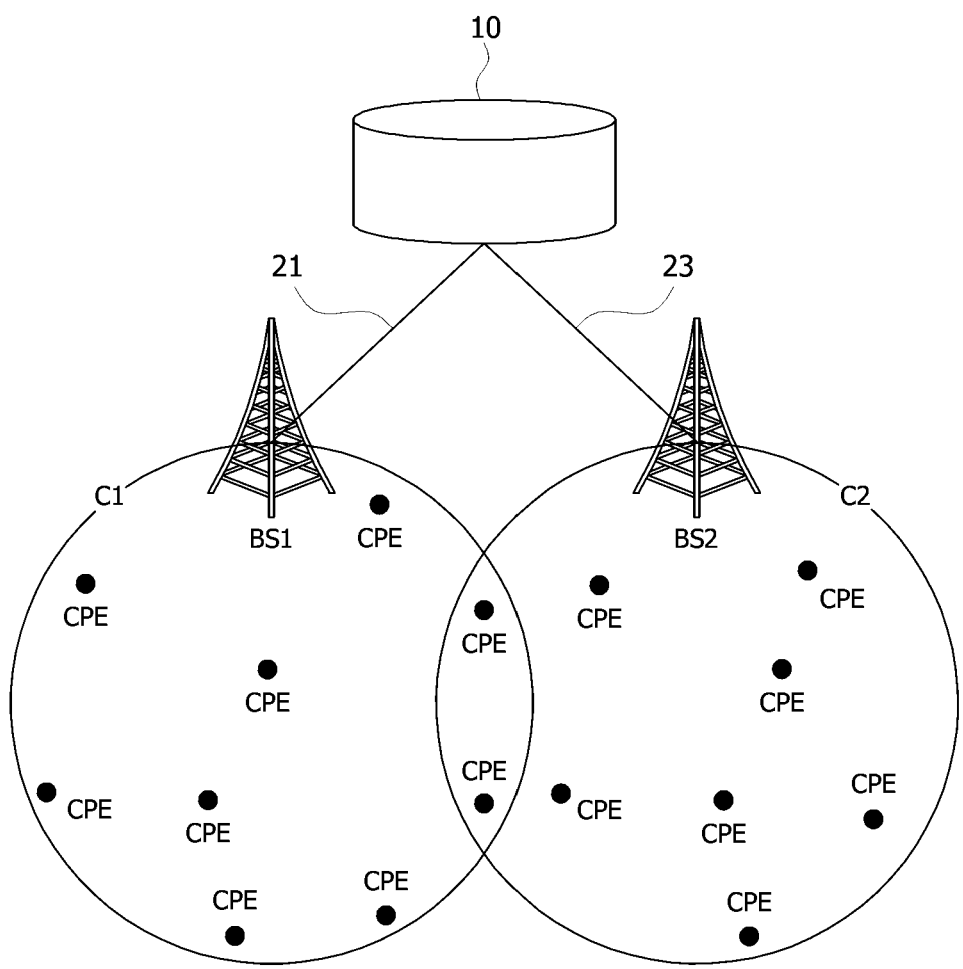
FIG. 1 is a schematic diagrammatic view showing a configuration of an IEEE 802.22 WRAN that provides mobility of a terminal according to an embodiment of the present invention.

FIG. 1 is a schematic diagrammatic view showing a configuration of an IEEE 802.22 WRAN that provides mobility of a terminal according to an embodiment of the present invention.

More specifically, referring to FIG. 1, at a cell area C1 of a first base station BS1 is located a plurality of attached terminals (CPEs) that is connected to the first base station BS1 to perform a communication with the first base station. In addition, at a cell area C2 of a second base station BS2 is located a plurality of attached terminals (CPEs) that is connected to the second base station BS2 to perform a communication with the second base station.

The first base station BS1 is connected to a registration database 10 through a wired backbone network 21, and the second base station BS2 is connected to the registration database 10 through a wired backbone network 23. The first base station BS1 is located at the cell area C1 of the first base station BS1, and registers and stores an identifier of and position information on an attached terminal that is connected to the first base station BS1 to perform a communication with the first base station BS1, in the registration database 10. The second base station BS2 is located at the cell area C1 of the second base station BS2, and registers and stores an identifier of and position information on an attached terminal that is connected to the second base station BS2 to perform a communication with the second base station BS2, in the registration database 10.

The attached terminals constituting the IEEE 802.22 WRAN according to an embodiment of the present invention can be moved to a neighboring base station cell from a base station cell where the attached terminals are registered. In this case, the attached terminals are handed off to the neighboring base station from the bases station where the attached terminals are located.

Figure 2:
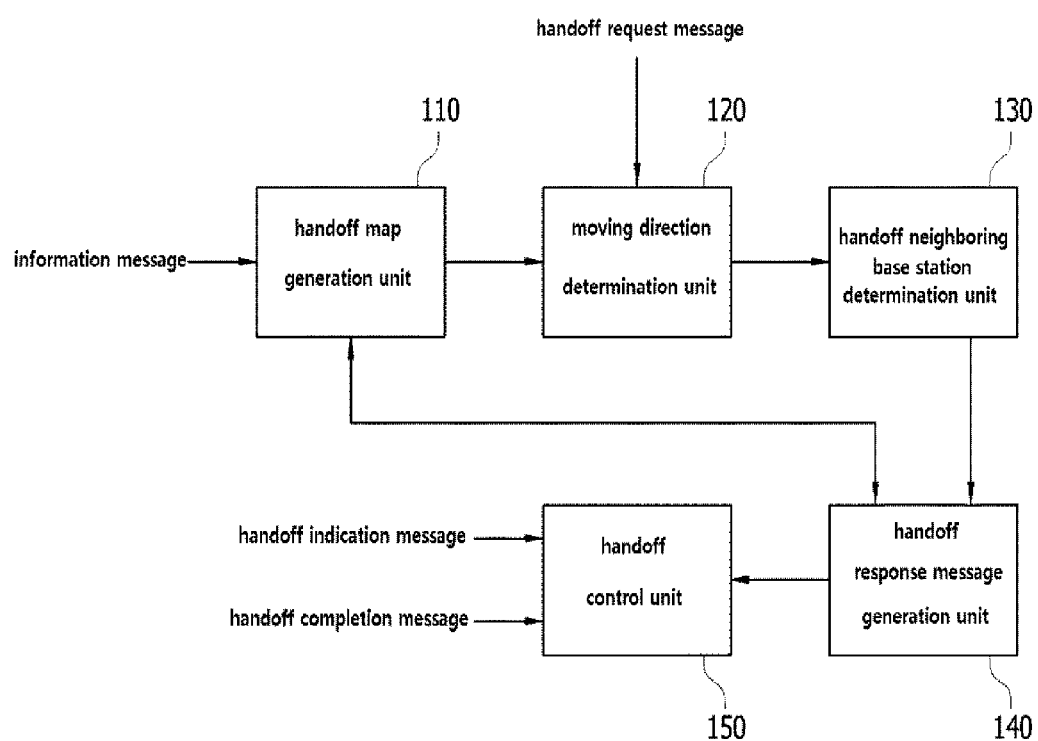
FIG. 2 is a functional block diagram showing a handoff control device included in a base station according to the present invention.

FIG. 2 is a functional block diagram showing a handoff control device included in a base station according to the present invention.

More specifically, referring to FIG. 2, a handoff map generation unit 110 periodically receives an information message including position information of the attached terminals, identifiers of the attached terminals, and information on the neighboring base station received by an attached terminal that is located at a cell area boundary and is operated in a coexisting mode, from the attached terminals located at the cell area of the base station. Then, the handoff map generation unit 110 generates a handoff map using the position information of the attached terminals, the identifiers of the attached terminals, and the information on the neighboring base station.

If a moving direction determination unit 120 receives a handoff request message including an identifier and position information of an attached mobile terminal requesting a handoff, from the attached mobile terminal moving from a cell area of a base station to a cell area of a neighboring base station, it determines a moving direction of the attached mobile terminal based on previous position information and current position information of the attached mobile terminal, which has been stored in the handoff map. A handoff neighboring base station determination unit 130 retrieves a neighboring base station located in the moving direction of the attached mobile terminal from the handoff map based on the moving direction of the attached mobile terminal, and determines the retrieved neighboring base station to be a handoff neighboring base station.

A handoff response message generation unit 140 generates a handoff response message including an identifier, an available channel, and position information of the handoff neighboring base station in response to the handoff request message, and transmits the generated handoff response message to the attached mobile terminal. When the handoff response message generation unit 140 transmits the handoff response message to the attached mobile terminal, a handoff control unit 150 transmits handoff information, e.g., session information and initialization setting information of the attached mobile terminal to the handoff neighboring base station through the wired backbone network for the purpose of rapid handoff. Meanwhile, when the handoff control unit 150 receives a handoff indication message from the attached mobile terminal after the attached mobile terminal has been handed off to the handoff neighboring base station, the handoff control unit 150 blocks a communication with the attached mobile terminal. In addition, when the handoff control unit 150 receives a handoff completion message of the attached mobile terminal from handoff neighboring base station through the wired backbone network, the handoff control unit 150 deletes and updates the attached mobile terminal among the attached terminals of the base state, which have been registered in the registration database.

Figure 3:
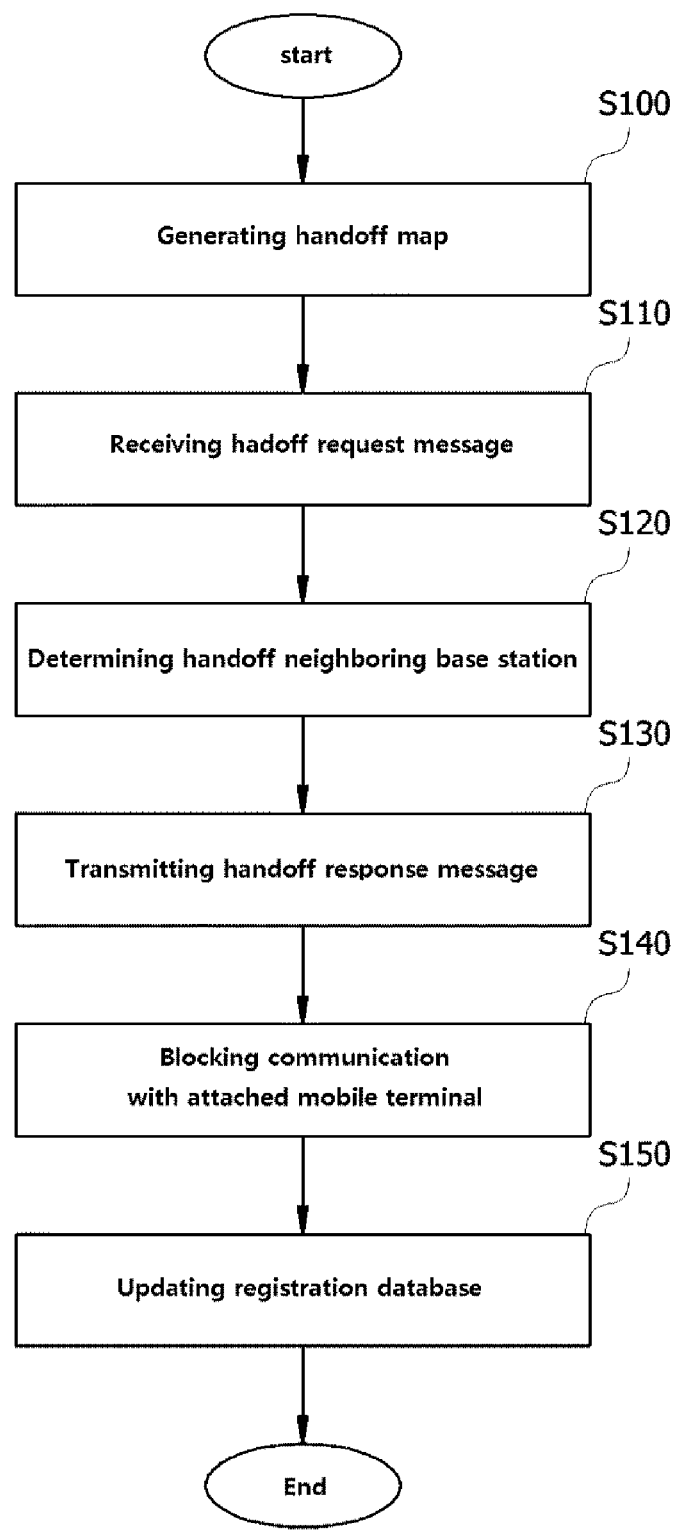
FIG. 3 is a flow chart showing a method for controlling a handoff of an attached mobile terminal in a base station according to an embodiment of the present invention.

FIG. 3 is a flow chart showing a method for controlling a handoff of an attached mobile terminal in a base station according to an embodiment of the present invention.

More specifically, referring to FIG. 3, a base station is located at a boundary of a cell area of the base station. The base station receives information on a neighboring base station from an attached terminal that is operated in a coexisting mode, and generates a handoff map using the received information on the neighboring base station, and an identifier of and position information on the attached terminal located at the cell area of the base station (S100). Then, when the base station receives a handoff request message including an identifier of and current position information on an attached mobile terminal moving to a neighboring base station among the attached terminals located at the cell area of the base station from the attached mobile (S110), it determines a moving direction of the attached mobile terminal based on previous position information and current position information of the attached mobile terminal, which has been stored in the handoff map, and determines a neighboring base station located in the moving direction of the attached mobile terminal from the handoff map based on the position information on the neighboring base station, which has been stored in the handoff map, to be a handoff neighboring base station (S120). Preferably, when the attached mobile terminal is moved to a cell area overlapped with that of the neighboring base station, the base station determines a plurality of neighboring base stations at the overlapped cell area to be handoff neighboring base stations. In this case, the coverage of the overlapped cell area of the neighboring base station can be set within a critical range set during the generation of the handoff map. The base station generates a handoff response message including identifiers, available channel lists, and position information of the determined handoff neighboring base stations and transmits the generated handoff response message to the attached mobile terminal (S130). Herein, the available channel list refers to a channel list including an operating channel and a preliminary channel of the handoff neighboring base station.

When the attached mobile terminal is handed off to the handoff neighboring base station after the handoff response message has been transmitted to the attached mobile terminal, the base station receives a handoff indication message from the attached mobile terminal, and blocks a communication with the attached mobile terminal in response to the received handoff indication message (S140). Meanwhile, when the base station receives a handoff completion message indicating that the attached mobile terminal is registered as an attached terminal of the handoff neighboring base station in the registration database, from the handoff neighboring base station, it deletes the identifier of and the position information on the attached mobile terminal among the attached terminals of the base station, which have been registered in the registration database, and updates the registration database (S150).

Figure 4:
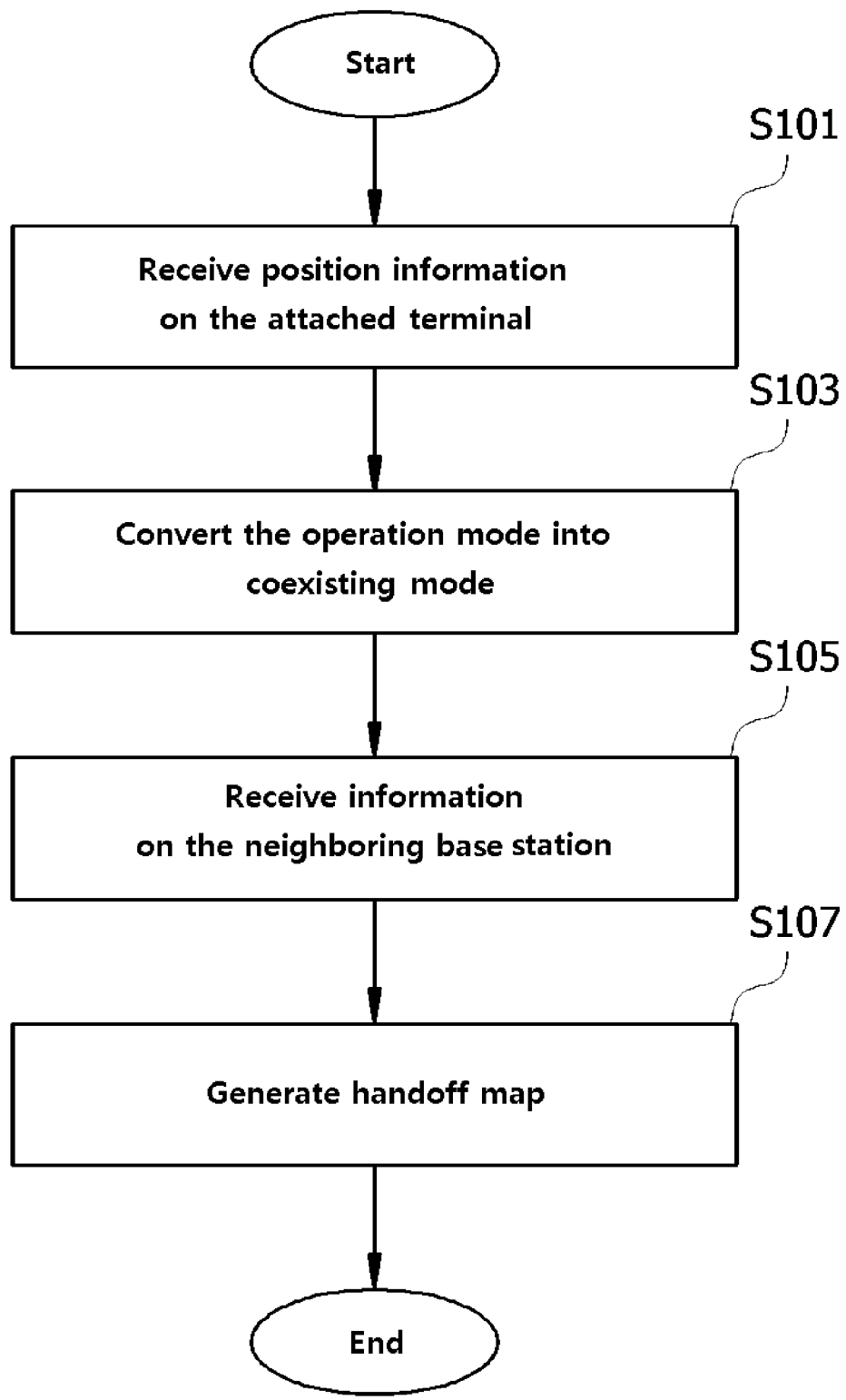
FIG. 4 is a flow chart showing a step of generating a handoff map in more detail in the handoff control method according to the present invention.
Figure 5:
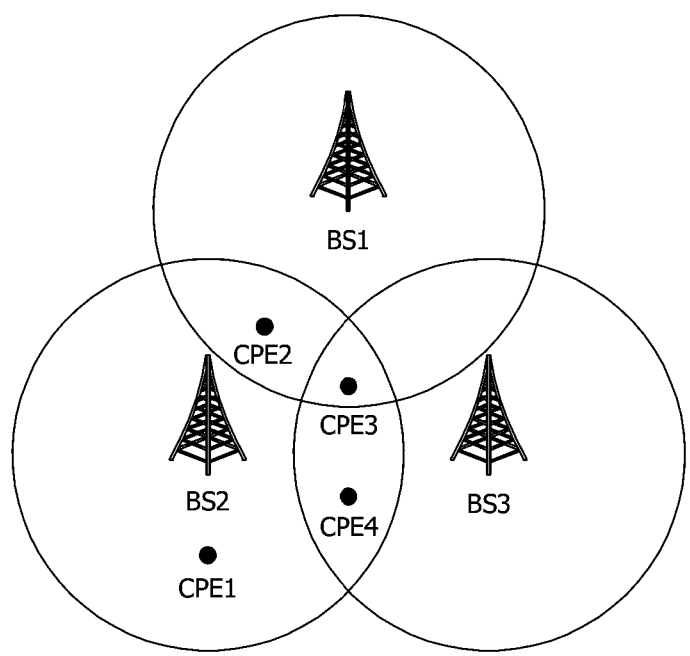
FIG. 5 is a schematic diagrammatic view showing an example of arrangement of a base station and neighboring base stations.
Figure 6:
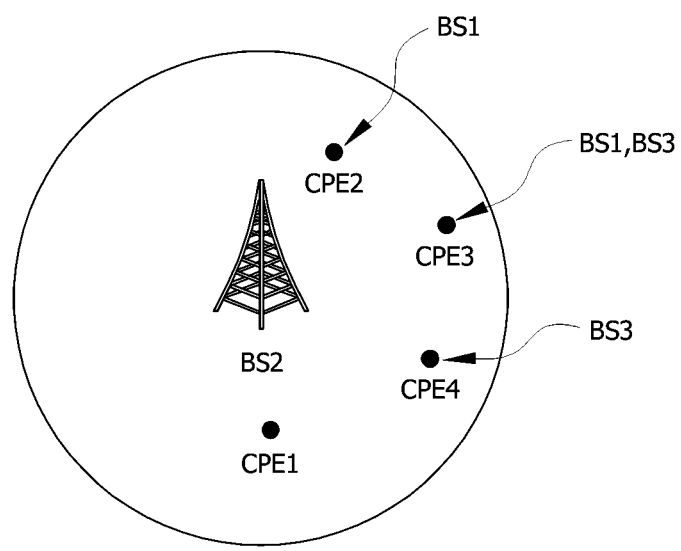
FIG. 6 is a schematic diagrammatic view showing an example of information on the neighboring base stations, which is collected by the attached terminal according to the arrangement example of the base station and the neighboring base stations of FIG. 5.

FIG. 4 is a flow chart showing a step of generating a handoff map in more detail in the handoff control method according to the present invention, FIG. 5 is a schematic diagrammatic view showing an example of arrangement of a base station and neighboring base stations, and FIG. 6 is a schematic diagrammatic view showing an example of information on the neighboring base stations, which is collected by the attached terminal according to the arrangement example of the base station and the neighboring base stations of FIG. 5.

More specifically, referring to FIGS. 4 to 6, the attached terminals located at a cell area of a base station acquire position information on the attached terminals through GPS modules disposed in the attached terminals, and periodically transmit the acquired position information on the attached terminals to the base station (S101). For example, in the case where the available channels of a first base station BS1 to a third base station BS3 are BS1={1, 2, 5}, BS2={3, 4, 7}, and BS3={6, 8, 9}, respectively, the attached terminals CPE1, CPE2, CPE3, and CPE4 located at a cell area of the second base station BS2 acquire position information on the attached terminals through GPS modules disposed therein, and periodically transmit the acquired position information to the second base station BS2 through the available channels of the second base station BS2.

The base station determines the attached terminals located at the cell area boundary of the base station based on the position information of the attached terminals, and controls the operation mode of the attached terminals located at the cell area boundary of the base station to be converted into a coexisting mode (S103). The attached terminals whose operation mode is converted into the coexisting mode periodically receive information on the neighboring base stations from the neighboring base stations in an idle mode in which a communication is not performed (S105). For example, the second base station BS2 determines the attached terminals CPE2, CPE3, CPE4 located at a cell area boundary thereof based on the position information received from the attached terminals CPE1, CPE2, CPE3, and CPE4 located at the cell area thereof, and controls the operation mode of the attached terminals CPE2, CPE3, and CPE4 located at the cell area to be converted into the coexisting mode. The attached terminals CPE2, CPE3, and CPE4 operating in the coexisting mode attempt listening for a certain period of time to receive a beacon message of the neighboring base stations BS1 and BS3 located around the attached terminals CPE2, CPE3, and CPE4 while periodically changing the operating channel to search the neighboring base stations BS1 and BS3 in case of the idle mode in which there is no packet being transmitted and received. In the case where the attached terminal CPE2 located at an overlapped cell area of the first base station BS1 and the second base station BS2 changes a listening channel to CH1, i.e., one of the operating channels of the first base station BS1, it can receive a beacon message of the first base station BS1 from the first base station BS1. In addition, In the case where the attached terminals CPE3 and CPE4 located at an overlapped cell area of the second base station BS2 and the third base station BS3 change a listening channel to CH6, i.e., one of the operating channels of the third base station BS3, they can receive a beacon message of the third base station BS3 from the third base station BS3. The beacon message received from the first base station BS1 or the third base station BS3 includes an identifier of, available channel list information on, and position information on the first base station BS1 or the third base station BS3.

The base station generates a handoff map based on the information on the neighboring base station, and the position information on and the identifier of the attached terminal (S107).

Figure 8:
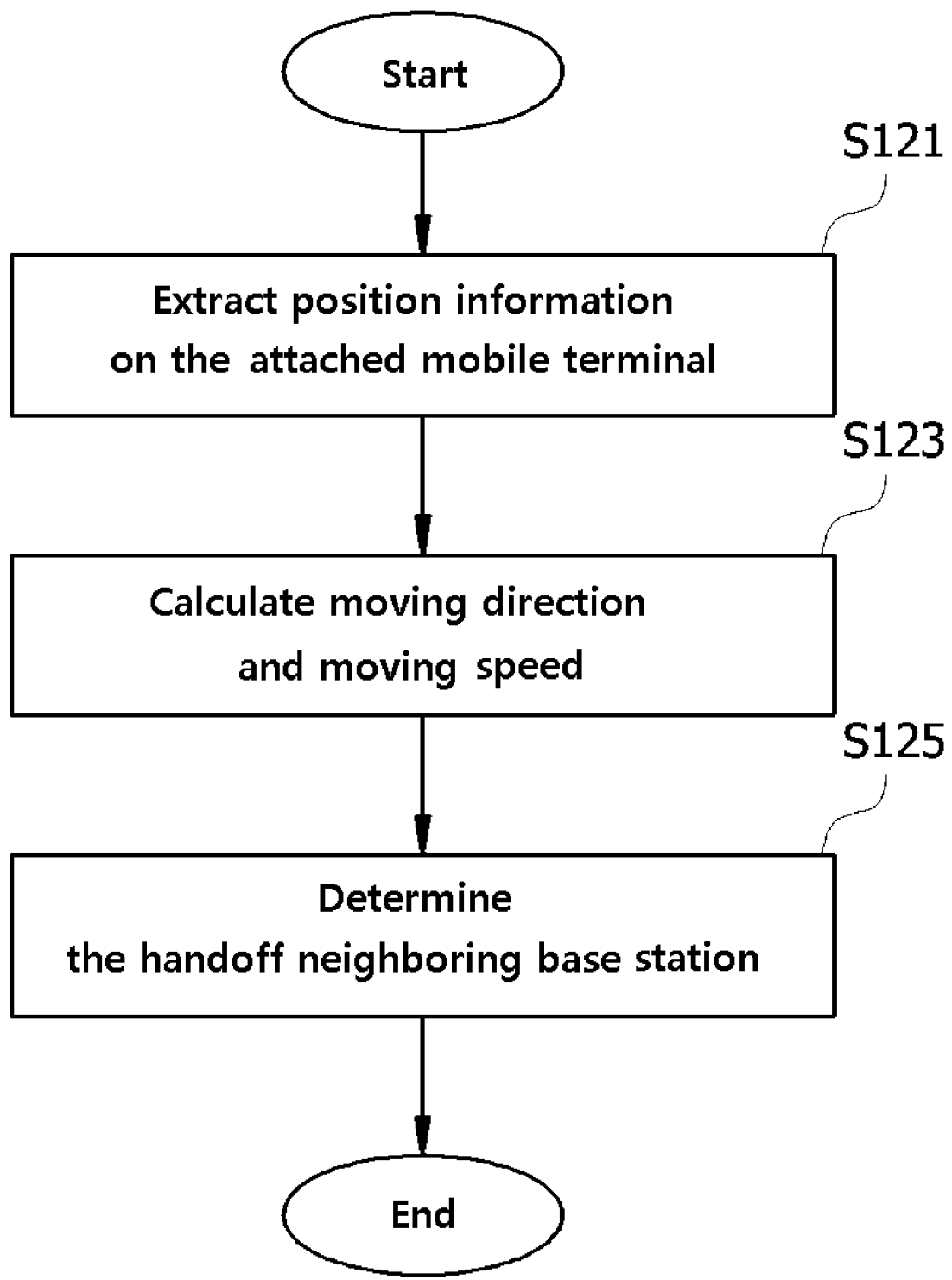
FIG. 8 is a flow chart showing a step of determining a handoff neighboring base station in more detail in the handoff control method according to the present invention.

FIG. 7 shows an example of fields of the generated handoff map and data corresponding to each of the fields, and FIG. 8 is a flow chart showing a step of determining a handoff neighboring base station in more detail in the handoff control method according to the present invention.

Referring to FIG. 8, the base station extracts the position information on the attached mobile terminal, which has been stored in the handoff map (S121), and calculates a moving direction of the attached mobile terminal based on the extracted position information and current position information on the attached mobile terminal (S123). A base station and a neighboring base station, and the attached terminals of the base station and the neighboring base station include a GPS module, respectively. In addition, the base station determines the moving direction of the attached mobile terminal based on the position information on the base station and the position information on the attached mobile terminal.

The base station retrieves a neighboring base station located in the moving direction of the attached mobile terminal from the handoff map based on the determined moving direction of the attached mobile terminal, and determines the retrieved neighboring base station to be a handoff neighboring base station (S125).

Figure 9:
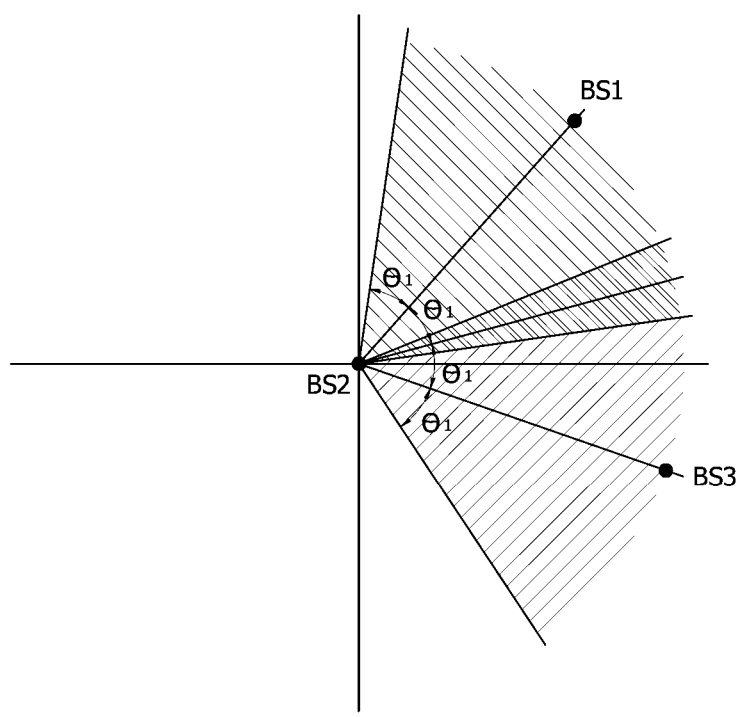
FIG. 9 is an example of set cell areas of the neighboring base stations in the arrangement example of the base station and the neighboring base stations shown in FIG. 5.

FIG. 9 is an example of set cell areas of the neighboring base stations in the arrangement example of the base station and the neighboring base stations shown in FIG. 5.

One half of an angle formed between a line formed by connecting the base station BS2 and the neighboring base station BS1 and a line formed by connecting the base station BS2 and the neighboring base station BS3 based on the position information on the neighboring base stations BS1 and BS3 centering on the base station BS2 is extended in the direction of the first neighboring base station BS1 to form a given extended angle area, and the given angle area is set as a region of the neighboring base station BS1. In the meantime, the other half of the angle formed between the line formed by connecting the base station BS2 and the neighboring base station BS1 and the line formed by connecting the base station BS2 and the neighboring base station BS3 is extended in the direction of the third neighboring base station BS3 to form a given extended angle area, and the given angle area is set as a region of the neighboring base station BS3. Preferably, a certain angle range of the first neighboring base station BS1 and the third neighboring base station BS3 is set as an overlapped region. When the attached mobile terminal is moved to the overlapped region, the base station BS2 determines the first neighboring base station BS1 and the third neighboring base station BS3 to be the handoff neighboring base stations.

Figure 10:
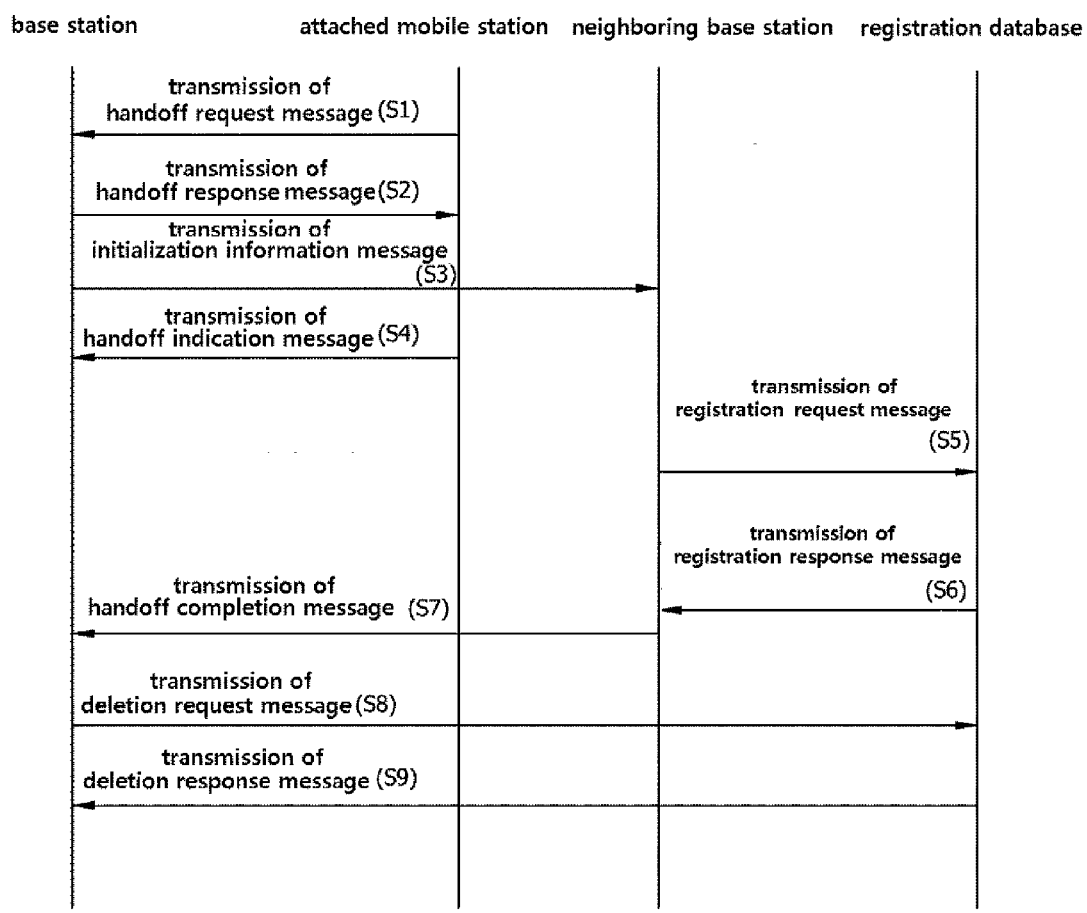
FIG. 10 is a schematic diagrammatic view showing the flow of messages transmitted and received to perform a handoff of an attached mobile terminal in the IEEE 802.22 WRAN that provides mobility of a terminal according to an embodiment of the present invention.

FIG. 10 is a schematic diagrammatic view showing the flow of messages transmitted and received to perform a handoff of an attached mobile terminal in the IEEE 802.22 WRAN that provides mobility of a terminal according to an embodiment of the present invention.

More specifically, referring to FIG. 10, an attached mobile terminal moving from a cell area of a base station to a cell area of a neighboring base station periodically measures the strength of a signal received from the base station. If the received signal of the attached mobile terminal is lower than a critical signal strength, the attached mobile terminal transmits a handoff request message for requesting a handoff to the base station (S1). When the base station receives the handoff request message from the attached mobile terminal, it determines a moving direction of the attached mobile terminal based on previous position information and current position information of the attached mobile terminal, which has been stored in the handoff map and determines the neighboring base station located in the moving direction of the attached mobile terminal to be a handoff neighboring base station using information on the neighboring base station, which has been stored in the handoff map. Then, the base station transmits a handoff response message including information of the handoff neighboring base station to the attached mobile terminal (S2). The base station transmits an initialization information message including session information and initialization setting information of the attached mobile terminal to the handoff neighboring base station through the wired backbone network for the purpose of rapid handoff (S3). Then, if the signal strength of a second beacon message received by the attached mobile terminal from the handoff neighboring base station is higher than that of a first beacon message received by the attached mobile terminal from the base station, the attached mobile terminal performs a handoff to the handoff neighboring base station and transmits a handoff indication message indicating that a handoff from the attached mobile terminal to the handoff neighboring base station has been completed to the base station (S4).

The attached mobile terminal performs a communication with the handoff neighboring base station through the operating channel of the handoff neighboring base station, and the handoff neighboring base station receives the identifier of and the position information on the attached mobile terminal from the attached mobile terminal. The handoff neighboring base station transmits a registration request message including the identifier of and the position information on the attached mobile terminal to the registration database in order to register the attached mobile terminal as an attached terminal of the handoff neighboring base station (S5). Then, the registration database registers the attached mobile terminal as an attached terminal of the handoff neighboring base station in response to the registration request message transmitted thereto from the handoff neighboring base station, and then transmits a registration response message indicating that the registration has been completed to the handoff neighboring base station (S6).

When the handoff neighboring base station receives the registration response message from the registration database, it transmits a handoff completion message indicating that the registration has been completed after a handoff of the attached mobile terminal to the handoff neighboring base station, to the base station through the wired backbone network (S7). When the base station receives the handoff completion message from the handoff neighboring base station, it transmits a deletion request message for requesting deletion of the identifier of the position information on the attached mobile terminal among the attached terminals of the base station to the registration database (S8). When the registration database has completed the deletion of the identifier of the position information on the attached mobile terminal among the attached terminals of the base station, it transmits a deletion response message indicating the completion of the deletion to the base station (S9).

Meanwhile, the embodiments of the present invention as described above can be constructed by a computer program that can be executed in a computer and can be implemented in a general-purpose digital computer that operates the program using a computer-readable recording medium.

The computer-readable recording medium includes recording media such as magnetic storage media (e.g., ROMs, floppy disks, hard disks, and the like), optical recording media (e.g., CD-ROMs, DVDs, and the like) and carrier waves (e.g., transmission through the Internet).

The embodiments as described above are merely illustrative and the invention is not limited to these embodiments. It will be appreciated by a person having an ordinary skill in the art that various equivalent modifications and variations of the embodiments can be made without departing from the spirit and scope of the present invention. Therefore, the true technical scope of the present invention should be defined by the technical spirit of the appended claims.

The invention claimed is:

1. A method for controlling handoff of a mobile terminal, the method comprising the steps of:

generating a handoff map including information on a neighboring base station located around a base station from identifiers of and position information on attached terminals located at a cell area of the base station, which are received from the attached terminals, and information on the neighboring base station, which is received by the attached terminals from the neighboring base station;

if the base station receives a handoff request message from an attached mobile terminal moving to the neighboring base station among the attached terminals, determining a handoff neighboring base station to which the attached mobile terminal is handed off based on the generated handoff map and information on the movement of the attached mobile terminal in response to the handoff request message;

allowing the base station to generate a handoff response message including the determined handoff neighboring base station, and to transmit the generated handoff response message to the attached mobile terminal; and if the base station receives a handoff indication message from the attached mobile terminal after the attached mobile terminal has been handed off to the neighboring base station based on the handoff response message, blocking a communication with the attached mobile terminal in response to the received handoff indication message, wherein the information on the neighboring base station is at least one from among position information on the neighboring base station, an identifier of the neighboring base station, and information on an available channel used by the neighboring base station, wherein the base station and the neighboring base station, and the attached terminals of the base station and the neighboring base station include a GPS module, respectively, and the position information on the neighboring base station is acquired by the GPS module, wherein the determining the handoff neighboring base station comprises:

receiving a handoff request message from the attached mobile terminal moving to the neighboring base station;

calculating a moving direction of the attached mobile terminal based on position information on the attached mobile terminal moving to the neighboring base station; and determining a neighboring base station located in the moving direction of the attached mobile terminal to be a handoff neighboring base station based on the calculated moving direction of the attached mobile terminal and the handoff map, wherein if a plurality of neighboring base stations are located in the moving direction of the attached mobile terminal, the plurality of neighboring base stations are determined to be the handoff neighboring base stations, and wherein if the plurality of neighboring base stations are determined to be the handoff neighboring base stations, the attached mobile terminal is handed off to a handoff neighboring base station which transmits a beacon message having the highest signal strength among the signal strengths of beacon messages transmitted thereto from the plurality of neighboring base station determined to be the handoff neighboring base station.

2. The method according to claim 1, wherein the attached mobile terminal compares of the signal strength of a first beacon message transmitted thereto from the base station with that of a second beacon message transmitted thereto from the handoff neighboring base station, and performs a handoff to the handoff neighboring base station and transmits a handoff indication message to the base station if the signal strength of the second beacon message is higher than that of the first beacon message.

3. The method according to claim 1, wherein the attached mobile terminal transmits a handoff request message to the base station if the signal strength of the first beacon message transmitted thereto from the base station is lower than a critical signal strength.

4. The method according to claim 1, wherein the step of generating the handoff map comprises the steps of:

periodically receiving position information on the attached terminals located at the cell area of the base station;

controlling the operation mode of the attached terminals to be converted into a coexisting mode, which are located at the cell area boundary of the base station;

receiving information on the neighboring base station from the attached terminals whose operation mode is converted into the coexisting mode; and generating a handoff map including information on the neighboring base stations located around the base station based on the received information on the neighboring base station.

5. The method according to claim 1, wherein the handoff map includes an identifier of the base station, position information on the attached mobile terminal of the base station, an identifier of the neighboring base station, information on an available channel of the base station, and information on an available channel of the neighboring base station.

6. The method according to claim 1, wherein the handoff control method conforms to an IEEE 802.22 WRAN communication standard using a frequency band that is not regionally used among television broadcasting frequency bands.

7. The method according to claim 6, further comprising, if the base station receives a handoff completion message from the handoff neighboring base station through a backbone network, deleting an identifier of the attached mobile terminal registered as an attached terminal of the base station, the identifier being stored in a registration database connected to the backbone network.

* * * * *